United States Patent [19]
Sakaguchi

[11] Patent Number: 5,264,978
[45] Date of Patent: Nov. 23, 1993

[54] SUPPORT MECHANISM FOR AN ECCENTRIC DRIVE PIN IN ROTATING DISK DATA STORAGE APPARATUS

[75] Inventor: Takahiro Sakaguchi, Kodaira, Japan
[73] Assignee: Teac Corporation, Tokyo, Japan
[21] Appl. No.: 900,196
[22] Filed: Jun. 17, 1992
[30] Foreign Application Priority Data
  Jun. 21, 1991 [JP] Japan .................. 3-055766[U]
[51] Int. Cl.⁵ .................................... G11B 5/016
[52] U.S. Cl. ..................................... 360/99.08
[58] Field of Search ................... 360/99.04, 99.08

[56] References Cited
U.S. PATENT DOCUMENTS

| | | | |
|---|---|---|---|
| 4,445,157 | 4/1984 | Takahashi | 360/133 |
| 4,758,915 | 7/1988 | Sakaguchi | 360/97 |
| 4,873,595 | 10/1989 | Taguchi et al. | 360/99.08 |
| 4,903,155 | 2/1990 | Maekawa et al. | 360/99.08 |
| 4,989,107 | 1/1991 | Tsukahara | 360/99.08 |
| 5,010,427 | 4/1991 | Taguchi et al. | 360/99.08 |
| 5,077,726 | 12/1991 | Dodds et al. | 360/99.04 |
| 5,103,358 | 4/1992 | Munekata | 360/99.04 |
| 5,126,900 | 6/1992 | Munekata | 360/99.08 |
| 5,151,836 | 9/1992 | Ichihara | 360/99.08 |

Primary Examiner—John T. Kwon
Attorney, Agent, or Firm—Woodcock Washburn Kurtz Mackiewicz & Norris

[57] ABSTRACT

A disk drive of the kind having a turntable for supporting a flexible magnetic disk thereon, a spindle extending centrally through the turntable for centering engagement in a first opening formed centrally in a sheet metal hub of the disk, and a drive pin arranged eccentrically of the turntable for driving engagement in a second opening formed eccentrically in the disk hub. For supporting the drive pin, a sheet metal drive pin support of approximately arcuate shape is mounted on the underside of the turntable for joint rotation therewith and has the drive pin erected on one end thereof so as to extend with clearance through an opening in the turntable. The drive pin support with the drive pin thereon is movable linearly relative to the turntable in a plane parallel to that of the turntable along a first notional line orthogonally intersecting a second notional line extending through the axes of the drive pin and the spindle. A biasing spring acts between turntable and drive pin support for biasing the drive pin at least in a predetermined direction of rotation of the turntable.

10 Claims, 6 Drawing Sheets

SUPPORT MECHANISM FOR AN ECCENTRIC DRIVE PIN IN ROTATING DISK DATA STORAGE APPARATUS

BACKGROUND OF THE INVENTION

This invention relates generally to apparatus for writing and/or reading information on disklike record media such as flexible magnetic disks, and more specifically to such apparatus of the class having a drive pin resiliently supported in an eccentric position on a turntable, the drive pin being engageable in an eccentric opening in the record medium for imparting the rotation of the turntable thereto. Still more specifically, the invention deals with an improved support mechanism for the drive pin of such rotating disk data storage apparatus.

A flexible magnetic disk having an eccentric slot to be engaged by a drive pin, and a disk drive for use therewith, are both described and claimed in U.S. Pat. No. 4,445,157 to Takahashi. The magnetic disk proposed by this patent has a diameter of three and a half inches and is rotatably housed in a generally flat, boxlike envelope of relatively rigid plastic material to make up a disk cassette. The magnetic disk has a rigid hub of magnetic material attached centrally thereto. The hub has defined therein a central opening of square shape and an eccentric opening of rectangular shape.

When positioned in the associated disk drive, the magnetic disk has its central hub placed on a turntable which is much less in diameter than the disk. The turntable has a permanent magnet mounted thereon for attracting the disk hub. Disposed centrally on the turntable, a spindle engages in the central opening in the disk hub for centering the disk on turntable. A drive pin is disposed eccentrically on the turntable for driving engagement in the eccentric opening or slot in the disk hub, imparting the rotation of the turntable to the magnetic disk.

The drive pin must be resiliently supported on the turntable for displacement both radially inwardly of the turntable and parallel to the axis of the spindle. The radially inward displacement of the drive pin is necessary for holding the disk in proper positional relationship with the turntable as the drive pin imparts the rotation of the turntable to the disk. The drive pin displacement parallel to the spindle axis is intended to cause the drive pin to spring into driving engagement in the eccentric slot in the disk hub after the turntable starts rotation in sliding contact therewith.

The three and a half inch magnetic disk has no index hole formed therein. The required index pulses are generated by photoelectrically or magnetoelectrically sensing an index mark formed on a part, such as a part of a disk drive motor, that rotates with the disk. The maintenance of proper positional relationship between the drive pin and the disk is therefore of utmost importance.

Conventionally, for resiliently supporting the drive pin as above, a planar leaf spring was employed, as described and claimed in U.S. Pat. No. 4,758,915 filed by Sakaguchi and assigned to the assignee of the instant application. The planar drive pin support spring was cantilevered, bored at one end to fit over the spindle and carrying the drive pin on the other end. Disposed parallel to the turntable, the planar drive pin support spring permitted easy displacement of the drive pin parallel to the spindle axis. For drive pin displacement radially inwardly of the turntable, on the other hand, the planar drive pin support spring underwent torsional displacement, thereby causing the drive pin to slant in the required direction.

This prior art device proved unsatisfactory as the drive pin slanted radially inwardly of the turntable upon establishment of driving engagement in the eccentric slot in the disk hub. There would be no problem at all if the drive pin slanted through the same angle, because then the magnetic disk would be in the same angular position relative to the drive pin. In practice, however, it is difficult to cause the drive pin to slant through the same angle. The result was variations in the angular position of the disk relative to the turntable and, in consequence, to the index mark on the disk drive motor. Such misplacement of the disk on the turntable could be a bar to correct data transfer between the disk and associated transducers.

In order to overcome the noted weakness arising from the slanting attitude of the drive pin upon driving engagement in the eccentric slot in the disk hub, it has been suggested to mount the drive pin support spring on the turntable for pivotal movement in a plane parallel to that of the turntable. The drive pin was mounted on one end of the support spring, and another spring was connected between the other end of the support spring and the turntable for biasing the drive pin approximately radially outwardly of the turntable. No substantial slanting of the drive pin became necessary according to this second prior art device.

However, the slanting of the drive pin was not totally eliminated, so that the angular position of the disk was still variable relative to the turntable. It must also be taken into consideration that the distance between the central opening and the eccentric slot in the hub of the magnetic disk is not necessarily the same but subject to change from one disk to another. The pivotal displacement of the drive pin about the fixed axis of the support spring was ineffective to thoroughly avoid variations in the angular position of the disk relative to the turntable in such cases.

SUMMARY OF THE INVENTION

The present invention seeks, in rotating disk data storage apparatus of the type defined, to establish the driving engagement of a drive pin in an eccentric opening in the disk with virtually no slanting of the drive pin and hence to reduce variations in the angular position of the disk relative to the turntable to an absolute minimum.

Stated in brief, the invention concerns an apparatus for data transfer with a rotating data storage disk, including a turntable for supporting the data storage disk thereon, a spindle extending centrally through the turntable for centering engagement in a first opening defined centrally in the data storage disk, and a drive pin arranged eccentrically of the turntable for driving engagement in a second opening defined eccentrically in the data storage disk.

More specifically, the invention resides in a drive pin support mechanism comprising a drive pin support supporting the drive pin, and mounting means mounting the drive pin support to the turntable for joint rotation therewith. The mounting means permits the drive pin support with the drive pin thereon to travel linearly relative to the turntable in a plane parallel to a principal plane of the turntable along a first notional line orthogonally intersecting a second notional line extending through the axes of the drive pin and the spindle. Also included is resilient means acting between the drive pin support and the turntable for urging the drive pin support at least toward the second notional line along the first notional line, that is, substantially in a predetermined direction of rotation of the turntable.

The linear displacement of the drive pin relative to the turntable in the rotational direction of the turntable is effective to eliminate the slanting of the drive pin in that direction upon driving engagement in the second opening in the disk. Consequently, the disk can be held in proper angular position on the turntable.

Preferably, the drive pin support may be mounted to the turntable for pivotal motion about an axis in an eccentric position on the turntable, besides being linearly movable along the first notional line. In this case the drive pin may be biased by the resilient means both in the rotational direction of the turntable and radially outwardly of the turntable. The disk will then be held in proper angular position on the turntable in the face of possible variations in positional relationship between the first and the second openings in the disk.

The above and other features and advantages of the present invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
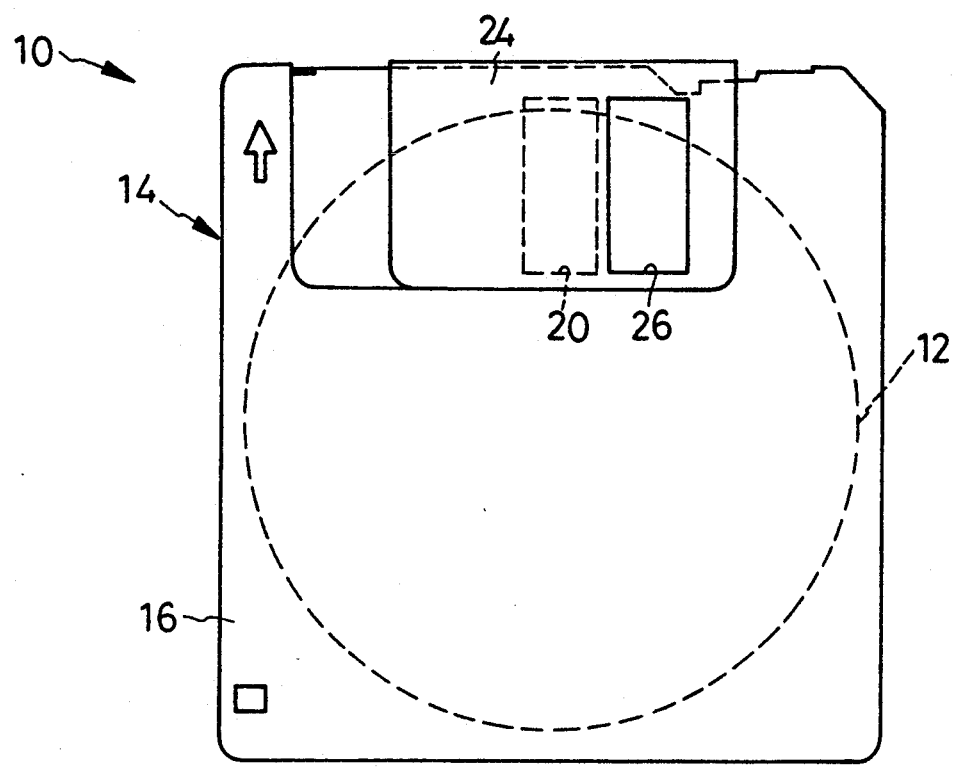
FIG. 1 is a top plan view of the known flexible magnetic disk cassette for use with the apparatus constructed in accordance with the present invention.

The known three and a half inch flexible magnetic disk cassette for use in the practice of this invention will first be briefly described, the better to make clear the features and advantages of the invention. Generally designated 10 in FIGS. 1 and 2, the disk cassette has a flexible magnetic disk 12 rotatably housed in a protective envelope 14 of rigid plastic material. The envelope 14 is of square, rather flat boxlike shape, having a front or top side 16 seen in FIG. 1 and a rear or bottom side 18 seen in FIG. 2.

Formed in both top 16 and bottom 18 sides of the envelope 14 and in the vicinity of one edge thereof, are apertures 20 and 22 which are in register with each other. The apertures 20 and 22 expose radial portions of the opposite sides of the magnetic disk 12 for data transfer contact with a pair of data transducers or read/write heads of the associated disk drive to be disclosed subsequently.

Normally, the apertures 20 and 22 are both closed by a sliding shutter 24 in the form of a rectangular piece of sheet metal bent into the shape of a U and mounted astride one edge of the envelope 14. The shutter 24 has itself two apertures 26 and 28 which are out of register with the envelope apertures 20 and 22 when the shutter is in the illustrated right hand position of FIGS. 1 and 2 under the bias of a spring (not shown).

When the disk cassette 10 is loaded in position in the associated disk drive, the shutter 24 will be forced leftwardly of the envelope 14 against the force of the unshown spring. Thereupon the shutter apertures 26 and 28 will come into register with the envelope apertures 220 and 22 thereby exposing the radial portions of the opposite sides of the magnetic disk 12 for data transfer with the data transducers of the disk drive.

Figure 2:
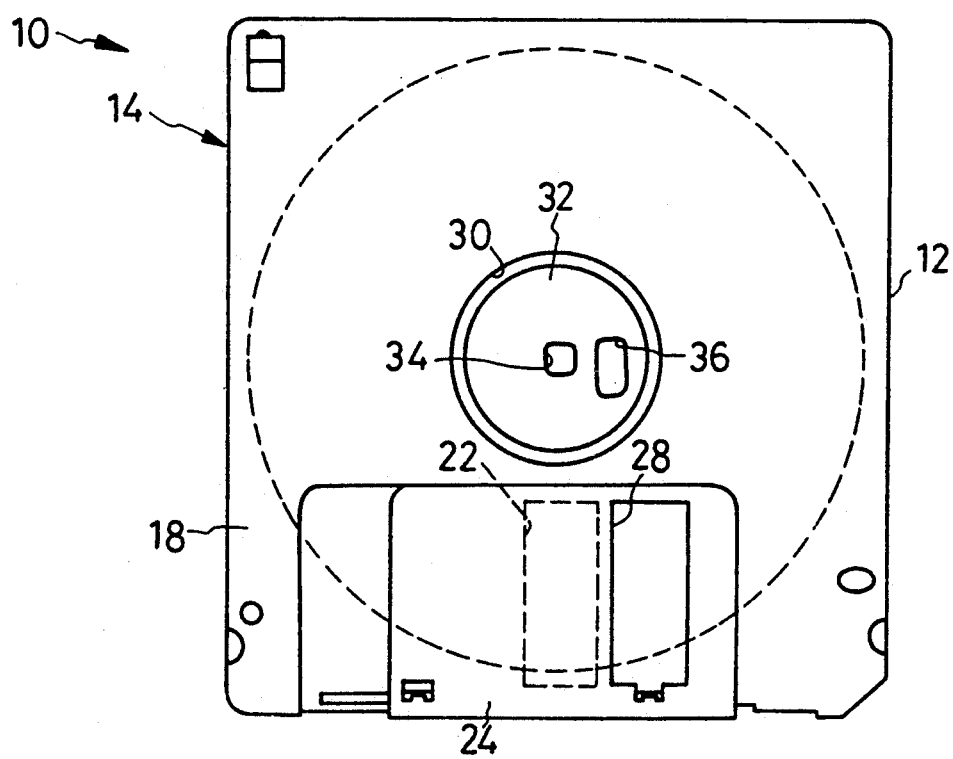
FIG. 2 is a bottom plan view of the magnetic disk cassette of FIG. 1.

The disk cassette 10 is to be placed upon the turntable of the disk drive with the top side 16 of its envelope 14 oriented upwardly. Therefore, as shown in FIG. 2, the bottom side 18 of the envelope 14 has a circular opening 30 formed centrally therein for working engagement of the magnetic disk 12 with the turntable. Exposed through the opening 30 is a hub 32 in the form of a disk of magnetic sheet metal attached centrally to the magnetic disk 12. The hub 32 has defined therein a central opening 34 of square shape and an eccentric opening 36 of rectangular shape.

Figure 3:
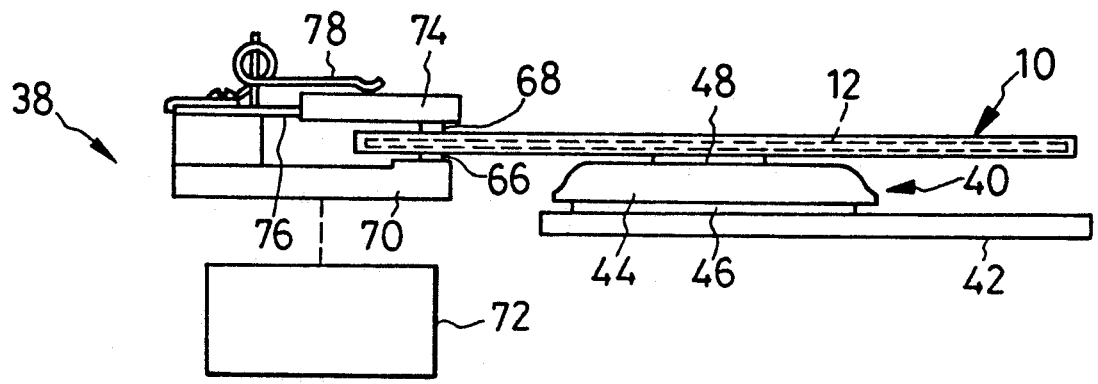
FIG. 3 is a side elevation of the disk drive for use with the disk cassette of FIGS. 1 and 2, the disk drive incorporating the improved drive pin support spring in accordance with the invention.
Figure 4:
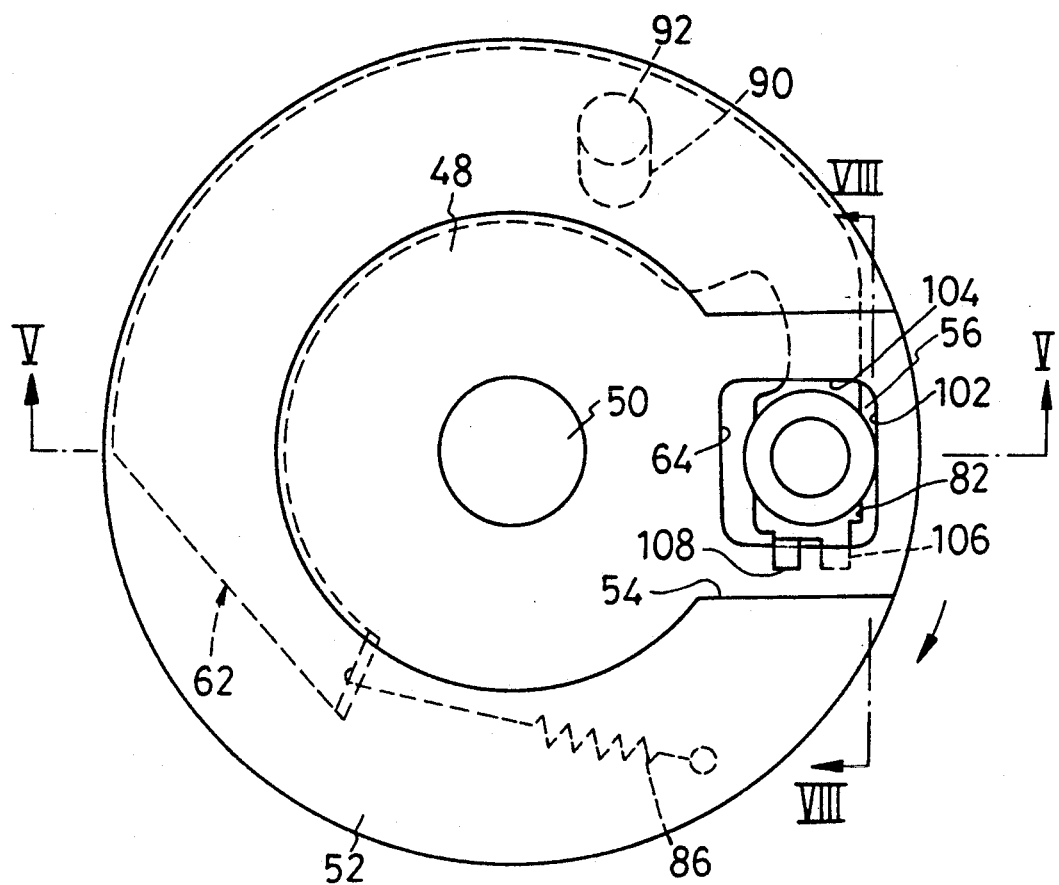
FIG. 4 is an enlarged top plan view of the turntable, shown together with the drive pin, drive pin support, and other means mounted thereto, in the disk drive of FIG. 3.
Figure 5:
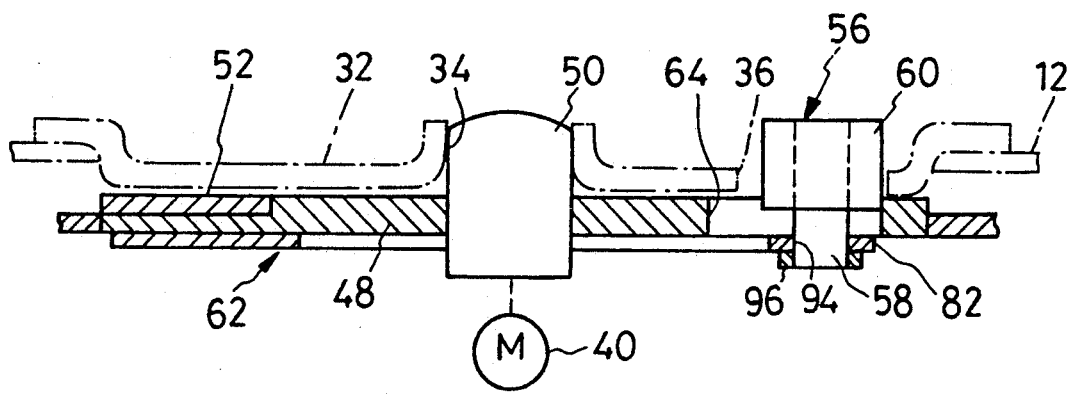
FIG. 5 is a section taken along the line V—V in FIG. 4.

Reference is now directed to FIGS. 3–5 for a study of a disk drive 38 for data transfer with the flexible magnetic disk cassette 10 of FIGS. 1 and 2. The disk drive 38 has an electric disk drive motor 40, FIG. 3, which is mounted to a printed circuit board 42. The disk drive motor 40 is shown as being of the known rotor-outside-stator configuration, having a rotor 44 disposed outside a stator 46 on the printed circuit board 42. The rotor 44 is rotatably supported on the printed circuit board 42 via a bearing, not shown. Annular in shape, the rotor 44 has its inside edge secured to the periphery of a turntable 48 for joint rotation therewith. The turntable 48 is itself rotatably supported by a spindle 50, FIGS. 4 and 5, extending through a hole formed centrally therein.

The disk cassette 10 is to be loaded in the disk drive 38 with the hub 32, FIG. 2, of the flexible magnetic disk 12 placed concentrically upon the turntable 48. The spindle 50 projects upwardly from the turntable 48 for centering engagement in the central opening 34 in the disk hub 32.

As shown also in FIGS. 4 and 5, the turntable 48 has a permanent magnet 52 mounted thereto for attracting the disk hub 32. Preferably, the permanent magnet 52 may be fabricated from magnetic plastic material, into what may be described as horseshoe shape, annular and cut out as at 54 in FIG. 4, to be mounted concentrically on the turntable 48. This turntable itself may be made from magnetic material to form a closed magnetic circuit with the disk hub 32.

FIGS. 4 and 5 also reveal a drive pin 56 arranged eccentrically of the turntable 48 for driving engagement in the eccentric slot 36 in the disk hub 32. Despite its name, however, the drive pin 56 may in practice be comprised of an upstanding shaft 58 and a roll 60 rotatably mounted thereon. Erected on a flat support 62 which is mounted to the underside of the turntable 48 for joint rotation therewith, the drive pin 56 extends with clearance through an aperture 64 in the turntable and the cutout 54 in the annular permanent magnet 52. The drive pin support 62 forms a part of the drive pin support mechanism according to the present invention and will be detailed presently.

When the disk cassette 10 is placed on the turntable 48 as shown in FIGS. 3 and 5, the spindle 50 will immediately enter the central opening 34 in the disk hub 32. In all likelihood, however, the drive pin 56 will initially be out of register with the eccentric slot 36 in the disk hub 32 and so will be thereby depressed into the turntable 48 against the force of the support 62. The drive pin 56 will come into register with the eccentric slot 36 as the turntable 48 is subsequently set into rotation. Thereupon the drive pin 56 will enter the eccentric slot 36 by virtue of the energy that has been stored in the support 62 and then, displaced radially inwardly of the turntable by the disk hub 32, make driving engagement with the disk hub, imparting the rotation of the turntable 48 to the magnetic disk 12 within the cassette envelope 14.

Thus the drive pin support 62 must permit displacement of the drive pin 56 in two directions, one parallel to the axis of the spindle 50 and the other normal thereto. More will be said about the drive pin support 62.

With reference back to FIG. 3 the disk drive 38 is conventionally equipped with a pair of data transducers 66 and 68 for data transfer with the opposite sides of the magnetic disk 12. The transducers 66 and 68 are both mounted to a carriage 70 for traveling across the annular concentric tracks on the magnetic disk 12. A carriage drive mechanism 72 for linearly moving the carriage 70 back and forth with the transducers 66 and 68 are shown as a block because of its conventional nature. An example of carriage drive mechanism comprises a bidirectional motor of the electric stepping type and a motion translating mechanism such as a lead screw for converting the bidirectional, incremental rotation of the stepping motor into the linear, stepwise, reciprocating motion of the carriage 70.

Although the bottom transducer 66 is mounted directly to the carriage 70, the top transducer 68 is mounted to a load arm 74 which in turn is pivotally mounted to the carriage via a cantilever spring 76. Also mounted to the carriage 70, a torsional load spring 78 acts on the load arm 74 for urging the top transducer 68 against the bottom transducer 66 via the magnetic disk 12. The load arm 74 with the top transducer 68 thereon is pivoted away from the bottom transducer 66 against the forces of the cantilever spring 76 and load spring 78 when the disk cassette 10 is being loaded in, and unloaded from, the disk drive 38.

Figure 6:
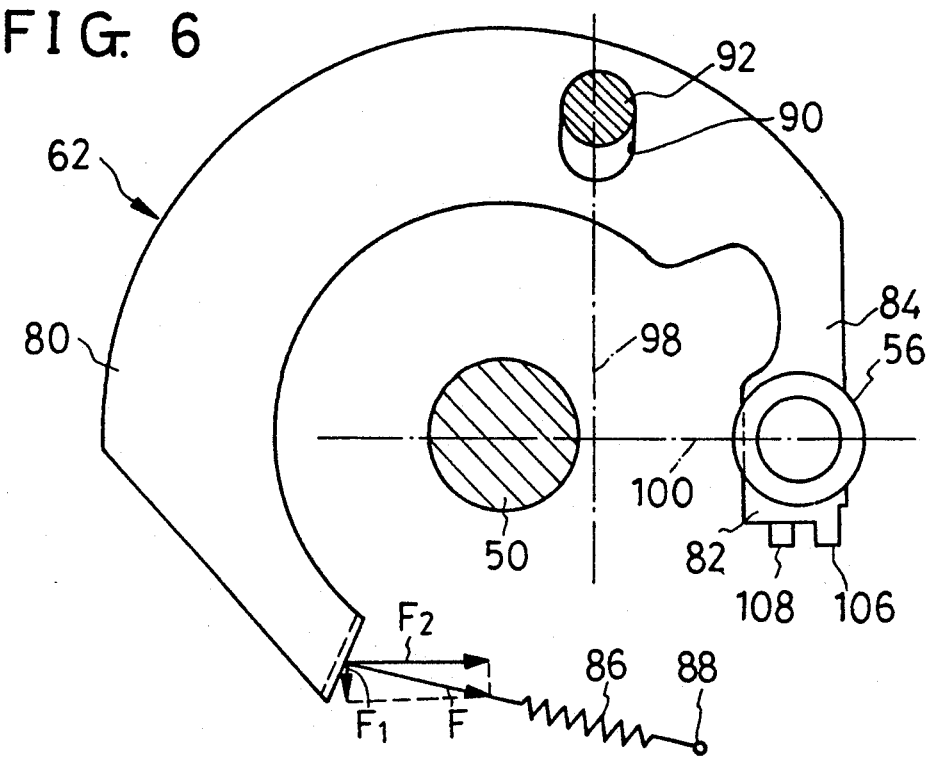
FIG. 6 is a top plan view of the drive pin support seen in FIG. 4, the drive pin support being shown together with the drive pin mounted thereon.
Figure 7:
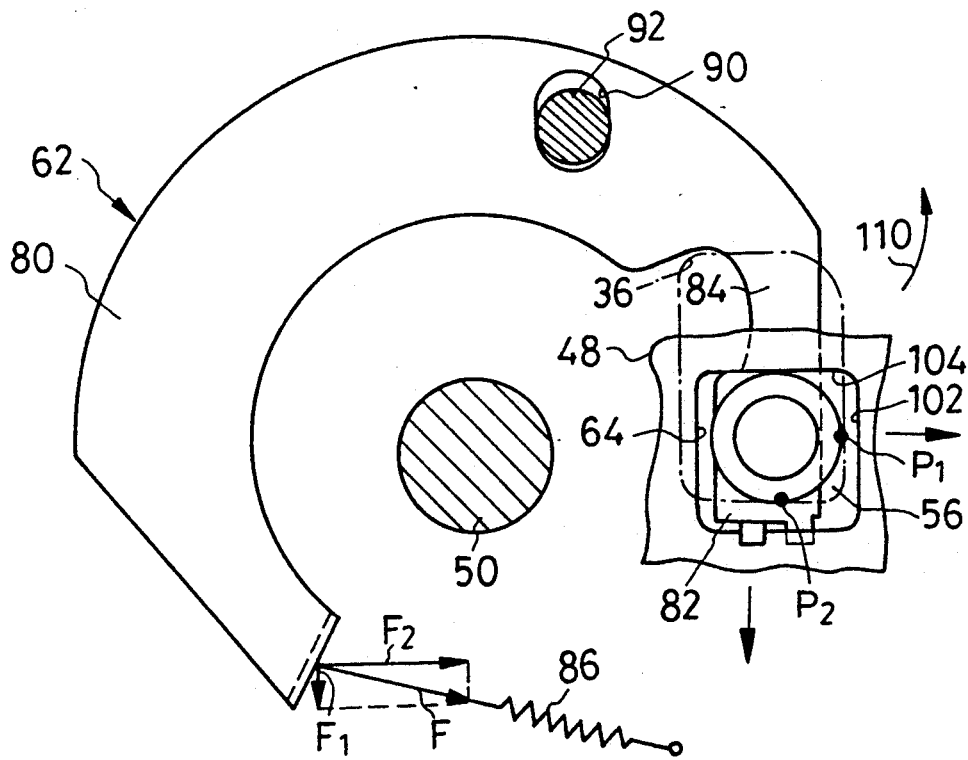
FIG. 7 is a view similar to FIG. 6 but showing the drive pin in driving engagement in the eccentric slot in the hub of the magnetic disk and in a clearance opening in the turntable.

The reader's attention is now invited to FIGS. 6 and 7 for a detailed discussion of the drive pin support mechanism including the support 62. Such discussion will be better understood by referring also to FIG. 4, in which the drive pin support 62 is depicted in phantom outline to indicate the positions of its various parts in relation to the spindle 50, turntable 48 and drive pin 56.

Fabricated from resilient sheet metal such as stainless steel, the drive pin support 62 has an arcuate body portion 80 joined at one end to a head portion 82 via a constricted neck portion 84. The other end of the body portion 80 is coupled to one end of a helical tension spring 86 which has its other end hooked to a retainer pin 88 on the underside of the turntable 48. The body portion 80 has formed therein a slot 90 in which is slidably received a headed pivot pin 92 depending from the turntable 48. Thus the drive pin support 62 is pivotally mounted on the underside of the turntable 48 in a plane parallel to the principal plane of the turntable, with the body portion 80 extending circumferentially of the turntable.

As shown also in FIG. 5, the shaft 58 of the drive pin 56 is closely inserted in a hole 94 in the head portion 82 of the drive pin support 62 and prevented from detachment therefrom by a collar 96. Thus supported by the support 62, the drive pin 56 extends upwardly therefrom through the clearance opening 64 in the turntable 48 and the cutout 54, FIG. 4, in the annular permanent magnet 52 for driving engagement in the eccentric slot 36 in the disk hub 32.

As seen in a plan view as in FIG. 6, the slot 90 in the body portion 80 of the drive pin support 62 extends in the direction of a first notional line 98 orthogonally intersecting a second notional line 100 connecting the axes of the spindle 50 and the drive pin 56. Accordingly, the drive pin support 62 is not only pivotable about the pivot pin 92 but also movable linearly in the direction of the first notional line 98 relative to the turntable 48. The tension spring 86 functions to bias the drive pin support 62 in a counterclockwise direction, as viewed in FIGS. 4, 6 and 7, about the pivot pin 92.

FIGS. 6 and 7 indicate that the biasing spring 86 extends at an acute angle to the second notional line 100, so that the pulling force F exerted by this spring on the drive pin support 62 resolves itself into two vectors designated $F_1$ and $F_2$. The first vector $F_1$, extending parallel to the first notional line 98, urges the drive pin support 62 to move in the direction of the slot 90 in its body portions 80 or substantially in a predetermined direction of rotation of the turntable 48, which direction is clockwise as viewed in FIG. 4. Normally, therefore, the drive pin support 62 is in the FIG. 6 position with respect to the headed pivot pin 92. Extending parallel to the second notional line 100, the second vector $F_2$ urges the drive pin support 62 to turn counterclockwise about the pivot pin 92 and so biases the drive pin 56 substantially radially outwardly of the turntable 48.

With reference to FIG. 7 the clearance opening 64 in the turntable 48, through which extends the drive pin 56, is of approximately square shape, having a first edge 102 extending parallel to the first notional line 98, and a second edge 104 extending parallel to the second notional line 100. The first edge 102 of the clearance opening 64 serves to limit the travel of the drive pin 56 in a radially outward direction of the turntable 48 under the force vector $F_2$ of the biasing spring 86. The second edge 104 serves to limit the travel of the drive pin 56 in a direction opposite to the rotational direction of the turntable 48 when the drive pin is pushed in that direction against the force vector $F_1$ of the biasing spring 86 by the hub 32 of the magnetic disk 12, as will be detailed in the course of the subsequent description of operation.

The drive pin support 62, particularly its constricted neck portion 84, is deflectable to permit the drive pin 56 to be depressed into the clearance hole 64 by the hub 32 of the magnetic disk 12 when this disk is loaded on the turntable 48. However, too much displacement of the drive pin 56 in the direction parallel to the axis of the spindle 50 is undesirable from the standpoint of desired reduction of the thickness of the disk drive 38.

Figure 8:
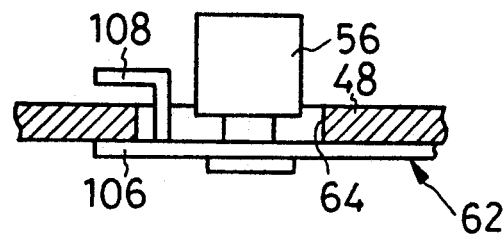
FIG. 8 is a fragmentary section taken along the line VIII—VIII in FIG. 4 and showing means for limiting the deflection of the drive pin support in a direction perpendicular to the turntable.

Accordingly, as best revealed by FIG. 8, the head portion 82 of the drive pin support 62 is partly bifurcated to provide a pair of prongs 106 and 108. The prong 106 extends from the head portion 82 in coplanar relationship therewith and underlies the turntable 48. The other prong 108 is bent into the shape of an L to overhang the turntable 48. The spacing between the pair of prongs 106 and 108, as measured in a direction normal to the plane of the turntable 48, is greater than the thickness of the turntable. The difference therebetween is the allowed distance of displacement of the drive pin 56 with the deflection of the neck portion 84 of the drive pin support 62.

OPERATION

Normally, or when the turntable 48 is out of rotation with the disk cassette 10 not loaded thereon, the drive pin support 62 is held flatwise against the underside of the turntable 48. The drive pin 62 will then extend normal to the plane of the turntable 48, projecting upwardly of the turntable through the clearance opening 64 in the turntable.

When the disk cassette 10 is loaded in the disk drive 38, and the disk 12 placed concentrically on the turntable 48, the spindle 50 will immediately enter the central opening 34 in the disk hub 32. Being perhaps initially out of register with the eccentric slot 36 in the disk hub 32, the drive pin 56 will be thereby depressed into the turntable 48 with the deflection of the neck portion 84 of the drive pin support 62 as the permanent magnet 52 on the turntable attracts the disk hub. Such depression of the drive pin 56 will be limited as the prong 108 of the drive pin support 62 comes to but on the top side of the turntable 48.

As the turntable 48 is subsequently set into rotation by the disk drive motor 40 in a clockwise direction as viewed in FIGS. 4, 7 and 8, the drive pin 56 will slide under the disk hub 32 and, before one complete revolution of the turntable, will come into register with the eccentric slot 36 in the disk hub. Thereupon the drive pin 56 will throw itself into the slot 36 by virtue of the energy that has been stored in the drive pin support 62 upon deflection of its neck portion 84. When thus admitted into the eccentric slot 36, the drive pin 56 will initially occupy the position indicated by the phantom outline in FIG. 9, which position is at or adjacent the upstream end of the slot with respect to the rotational direction of the turntable 48.

Figure 9:
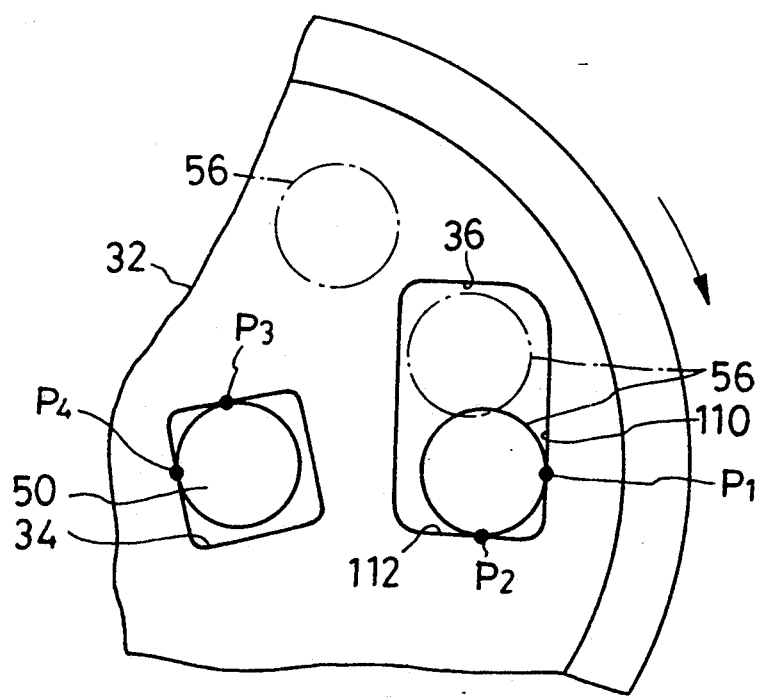
FIG. 9 is an enlarged, fragmentary top plan view explanatory of various positions of the drive pin with respect to the eccentric slot in the hub of the magnetic disk, and of the position of the spindle in the central opening in the disk hub, during the rotation of the magnetic disk.

A consideration of FIG. 9 will reveal that the eccentric slot 36 extends at an angle to, rather than at right angles with, a line connecting the axis of the disk hub 32 and the geometric center of the slot. That angle is such that the disk hub edge 110 bounding the radially outer side of the slot 36 draws nearer the center of the disk hub 32 as it extends in the arrow marked direction of turntable rotation. Consequently, the distance between the center of the disk hub 32 and the point of contact between drive pin 56 and edge 116 comes to a minimum when the drive pin reaches the solid line position of FIG. 8, contacting the radially outer edge 110 of the slot 36 at a point $P_1$ and the downstream edge 112 of the slot at a point $P_2$.

The drive pin 56 is in a final drive position with respect to the disk hub 32 when in the solid line position of FIG. 8. The drive pin 56 when in this final drive position is in proper driving engagement with the disk hub 32. The spindle 50, on the other hand, will contact at points $P_3$ and $P_4$ two neighboring ones of the generally square disk hub edges defining the central opening 34 when the drive pin 56 is in the final drive position.

Before reaching the final drive position, the drive pin 56 will come into contact with the edge 110 of the slot 36 at a point somewhere upstream of the point $P_1$ as the drive pin revolves clockwise with the turntable 48 after entering the slot in the phantom position of FIG. 8. The drive pin support 62 will be in the position of FIG. 4 relative to the turntable 48 before the drive pin 56 comes into contact with the slot edge 116 because then no force is being exerted by the disk hub 32 on the drive pin.

Then, after contacting the slot edge 116, the drive pin 56 will slide over that edge with the continued rotation of the turntable 48 relative to the disk hub 32 and be thereby gradually forced toward the center of the disk hub. Such travel of the drive pin 56 radially inwardly of the turntable 48 will take place as the drive pin support 62 pivots clockwise, as viewed in FIGS. 4, 6 and 7, against the force vector $F_2$ of the biasing spring 86. Thus the drive pin 56 will travel radially inwardly of the turntable 48 with little or no torsional deflection of the drive pin support 62 and, in consequence, with little or no slanting of the drive pin.

The drive pin 56 on subsequently reaching the final drive position will start driving the magnetic disk 12. By reaction, then, the disk 12 will start forcing the drive pin 56 in a direction opposite to that of the rotation of the turntable 48 in opposition to the force vector $F_1$ of the biasing spring 86. Thereupon the drive pin support 62 with the drive pin 56 thereon will be substantially linearly displaced along the first notional line 98 in a direction away from the second notional line 100 against the force vector $F_1$ of the biasing spring 86, from the FIG. 6 position to that of FIG. 7. The drive pin 56 when in this FIG. 7 position will butt against the second edge 104 of the clearance opening 64 in the turntable 48. The drive pin 56 will travel as above with little or no torsional deflection of the drive pin support 62, too, since the drive pin support is movable relative to the pivot pin 92 along the first line 98.

The drive pin 56 has now been positioned in proper driving engagement with the disk hub 32 and with the turntable 48. The drive pin will firmly stay in this final drive position, positively imparting the rotation of the turntable 48 to the disk 12, as the force vector $F_2$ of the biasing spring 66 urges the drive pin against the radially outer edge 110 of the eccentric slot 36 in the disk hub 32.

As has been clearly set forth hereinbefore, the drive pin 56 travels relative to the turntable 48 with the displacement of the drive pin support 62 in its own plane in both radial and circumferential directions of the turntable. As the drive pin maintains its upstanding attitude upon establishment of driving engagement with the disk hub, no positioning errors are to take place due to the slanting of the drive pin to varying degrees. Additionally, even if the magnetic disk 12 has a dimensional error in the distance between central opening 34 and eccentric slot 36, the drive pin will nevertheless be properly positioned with respect to the central opening 34 because the final position of the drive pin in the direction of the notional line 98 depends upon the edge 104 of the clearance opening 64 in the turntable 48.

SECOND FORM

Figure 10:
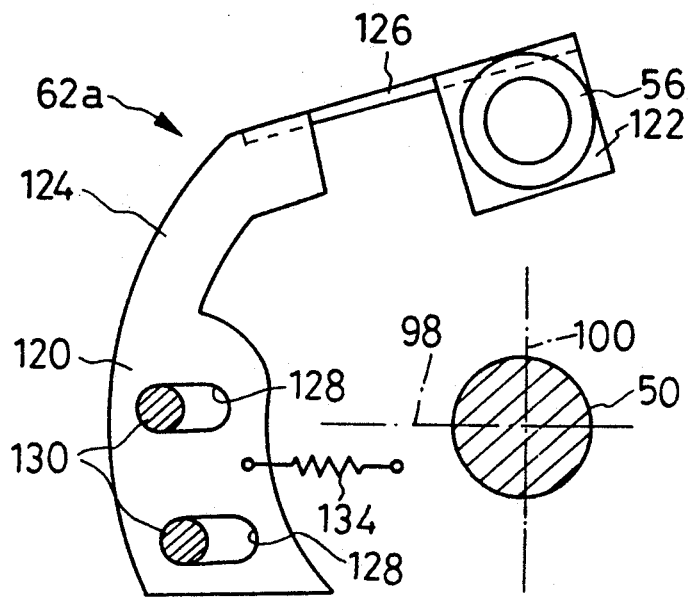
FIG. 10 is a view similar to FIG. 6 but showing an alternate form of drive pin support mechanism in accordance with the invention.
Figure 11:
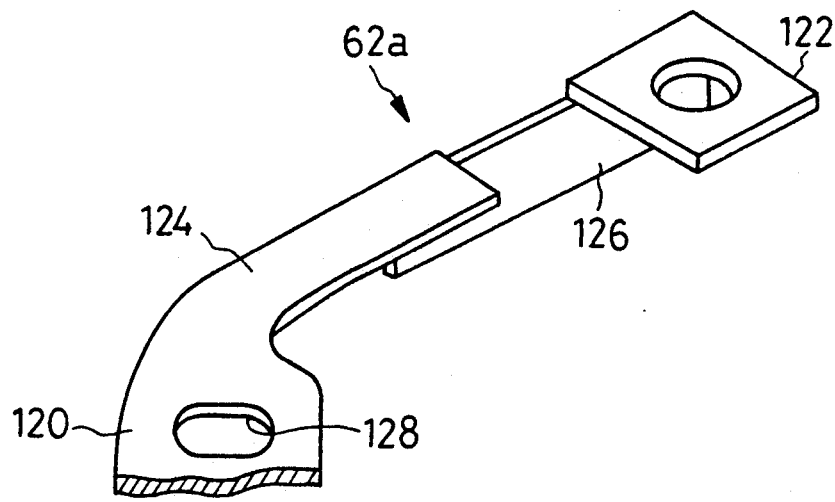
FIG. 11 is an enlarged, fragmentary perspective view of the drive pin support seen in FIG. 10.

FIGS. 10 and 11 show another preferred form of drive pin support 62a according to the invention. Fabricated from a single piece of resilient sheet metal such as stainless steel, the drive pin support 62a comprises an arcuate body portion 120 at one end, a head portion 122 at another end, and a first 124 and a second 126 neck portion intermediate the body portion and the head portion.

The body portion 120 of the modified drive pin support 62a has formed therein a pair of slots 128 extending parallel to the second notional line 98. Depending from the turntable, not shown in FIGS. 10 and 11, a pair of headed pins 130 are slidably engaged one in each slot 128. The drive pin support 62a is therefore linearly movable in the direction of the line 98 but is not pivotable relative to the turntable. A helical tension spring 134 acts between the turntable and the drive pin support to bias the latter toward the spindle 50 along the line 98.

The first neck portion 124 forms a coplanar extension from the body portion 120 in the circumferential direction of the turntable. This first neck portion is deflectable in a direction parallel to the axis of the spindle 50. The second neck portion 126 extends between head portion 122 and first neck portion 124 and lies in a plane parallel to the axis of the spindle 50. This second neck portion is therefore deflectable only in a direction normal to the axis of the spindle. The drive pin 56 is mounted upstandingly on the head portion 122 which is in coplanar relationship to the body portion 120 and the first neck portion 124.

OPERATION OF SECOND FORM

The alternate drive pin support 62a has the first neck portion 124 devoted to drive pin displacement parallel to the spindle axis, and the second neck portion 126 devoted to drive pin displacement radially inwardly of the turntable. Little or no torsional deformation of the drive pin support 62a is therefore necessary for drive pin displacement in a radial direction of the turntable. Thus maintained substantially in an upstanding attitude when in driving engagement in the eccentric slot in the disk hub, the drive pin 56 will positively impart the rotation of the turntable to the magnetic disk.

Any slanting of the drive pin 56 in the direction of the line 98 will be prevented as the drive pin support 62a as a whole is linearly displaced against the force of the biasing spring 134 in sliding contact with the pair of headed pins 130. The drive pin 56 will be captured upstandingly between the edge 112, FIG. 9, of the eccentric slot 36 in the disk hub 32 and the edge 104, FIG. 7, of the clearance opening 64 in the turntable 48 upon linear displacement of the drive pin support 62a against the force of the biasing spring 134.

Thus, in this alternate embodiment, the drive pin 56 travels along the first notional line 98 with the linear displacement of the drive pin support 62a in sliding engagement with the headed pins 130, along the second notional line 100 with the deflection of the second neck portion 126 of the drive pin support 62a, and in a direction parallel to the spindle axis with the deflection of the first neck portion 124 of the drive pin support. Accordingly, the slanting of the drive pin 56 in its final drive position can be reduced to an absolute minimum.

THIRD FORM

Figure 12:
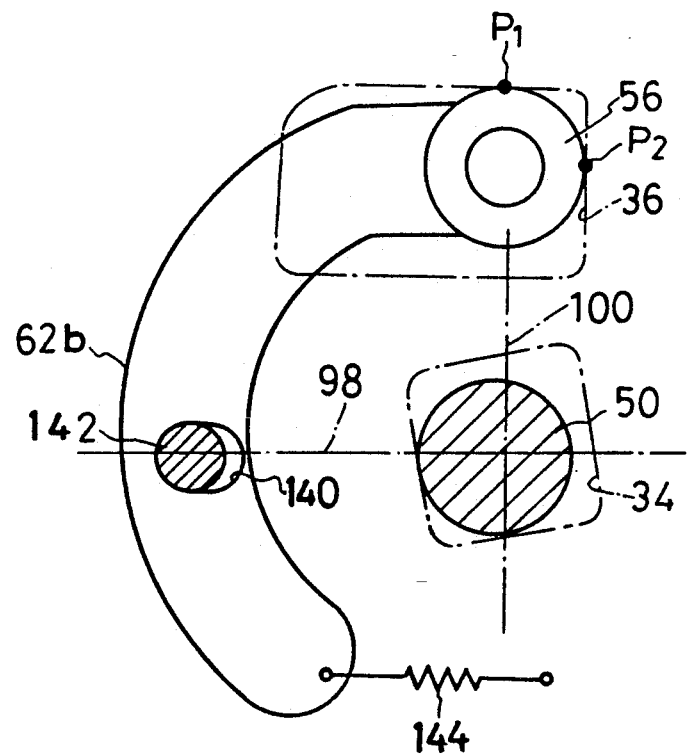
FIG. 12 is also a view similar to FIG. 6 but showing still another alternate form of drive pin support mechanism in accordance with the invention.

In FIG. 12 is shown another alternate drive pin support 62b according to the invention. This drive pin support 62b is itself of conventional make in being torsionally deformable to permit the slanting of the drive pin 56. However, the drive pin support 62b has a slot 140 formed intermediate the opposite ends thereof for slidably receiving a headed pivot pin 142 on the underside of the turntable, not shown in FIG. 12, so that the drive pin support is not only pivotable about the about the pivot pin 142 but slidable along the notional line 98. A helical tension spring 144 acts between one end of the drive pin support 62b and the turntable for biasing the drive pin support 62b radially inwardly of the turntable along the notional line 98. Erected on the other end of the drive pin support 62b, the drive pin 56 will slant to a much less degree than if the drive pin support were not linearly movable along the line 98 as in the noted prior art.

Although the drive pin support mechanism according to the present invention has been shown and described hereinbefore in some specific forms thereof and as adapted for the disk drive of the FIG. 3–5 construction for use with the magnetic disk cassette of the FIGS. 1–2 construction, it is not desired that the invention be limited by the exact details of the illustrated drive pin support mechanisms or of the disk drive or of the disk cassette. For example, in the FIGS. 3–9 embodiment, the drive pin support 62 could be of rigid material since the displacement of the drive pin in a direction parallel to the spindle axis is not an absolute requirement, as has recently proved. A variety of other modifications, alterations or adaptations of the illustrated embodiments may be resorted to without departure from the fair meaning or proper scope of the following claims.

What is claimed is:

1. An apparatus for data transfer with a rotating data storage disk, including a turntable for supporting the data storage disk thereon, a spindle extending centrally through the turntable for centering engagement in a first opening defined centrally in the data storage disk, and a drive pin arranged eccentrically of the turntable for driving engagement in a second opening defined eccentrically in the data storage disk, the drive pin having an axis parallel to an axis of the spindle, wherein the improvement resides in a drive pin support mechanism comprising:

(a) a drive pin support for supporting the drive pin;
   (b) mounting means for mounting the drive pin support to the turntable for joint rotation therewith, the mounting means permitting the drive pin support with the drive pin thereon to travel linearly relative to the turntable in a plane parallel to a principal plane of the turntable along a first notional line orthogonally intersecting a second notional line extending through the axes of the drive pin and the spindle; and (c) resilient means acting between the drive pin support and the turntable for urging the drive pin support at least toward the second notional line along the first notional line.

2. An apparatus for data transfer with a rotating data storage disk, including a turntable for supporting the data storage disk thereon, the turntable having a predetermined direction of rotation, a spindle extending centrally through the turntable for centering engagement in a first opening defined centrally in the data storage disk, and a drive pin arranged eccentrically of the turntable for driving engagement in a second opening defined eccentrically in the data storage disk, the drive pin having an axis parallel to an axis of the spindle, wherein the improvement resides in a drive pin support mechanism comprising:

(a) a drive pin support for supporting the drive pin;

(b) mounting means for mounting the drive pin support to the turntable for joint rotation therewith and for pivotal motion relative to the turntable about an axis in an eccentric position on the turntable, the mounting means permitting the drive pin support with the drive pin thereon to travel linearly relative to the turntable in a plane parallel to a principal plane of the turntable along a first notional line orthogonally intersecting a second notional line extending through the axes of the drive pin and the spindle; and (c) resilient means acting between the drive pin support and the turntable for urging the drive pin both in the predetermined direction of rotation of the turntable and radially outwardly of the turntable.

3. An apparatus for data transfer with a rotating data storage disk, including a turntable for supporting the data storage disk thereon, the turntable having a predetermined direction of rotation, a spindle extending centrally through the turntable for centering engagement in a first opening defined centrally in the data storage disk, and a drive pin arranged eccentrically of the turntable for driving engagement in a second opening defined eccentrically in the data storage disk, the drive pin having an axis parallel to an axis of the spindle, wherein the improvement resides in a drive pin support mechanism comprising:

(a) a drive pin support of substantially arcuate shape for supporting the drive pin on one end thereof, the drive pin support having defined intermediate opposite ends thereof a slot extending along a first notional line orthogonally intersecting a second notional line extending through the axes of the drive pin and the spindle;

(b) a pivot pin formed in an eccentric position on the turntable and slidably engaged in the slot in the drive pin support so that the drive pin support is both pivotable and movable linearly along the first notional line relative to the turntable; and (c) a biasing spring acting between the turntable and another end of the drive pin support for urging the drive pin both in the predetermined direction of rotation of the turntable and radially outwardly of the turntable.

4. The apparatus of claim 3 wherein the drive pin support is of resilient sheet metal so that the drive pin support is deflectable to permit the drive pin to be displaced in a direction substantially parallel to the axis of the spindle.

5. The apparatus of claim 4 wherein the drive pin support is formed to include a constricted neck portion.

6. The apparatus of claim 4 wherein the drive pin support is formed to include a pair of prongs disposed on both sides of the turntable for limiting the displacement of the drive pin in the direction substantially parallel to the axis of the spindle.

7. An apparatus for data transfer with a rotating data storage disk, including a turntable for supporting the data storage disk thereon, the turntable having a predetermined direction of rotation, a spindle extending centrally through the turntable for centering engagement in a first opening defined centrally in the data storage disk, and a drive pin arranged eccentrically of the turntable for driving engagement in a second opening defined eccentrically in the data storage disk, the drive pin having an axis parallel to an axis of the spindle, wherein the improvement resides in a drive pin support mechanism comprising:

(a) a drive pin support fabricated from resilient sheet metal and comprising a body portion, a first neck portion deflectable in a direction substantially parallel to the axis of the spindle, a second neck portion deflectable in a direction substantially in a radial direction of the turntable, and a head portion for supporting the drive pin thereon;

(b) mounting means for coupling the body portion of the drive pin support to the turntable, the mounting means permitting the drive pin support with the drive pin thereon to travel linearly relative to the turntable in a plane parallel to a principal plane of the turntable along a first notional line orthogonally intersecting a second notional line extending through the axes of the drive pin and the spindle; and (c) resilient means acting between the drive pin support and the turntable for urging the drive pin toward the second notional line along the first notional line.

8. The apparatus of claim 7 wherein the mounting means comprises a pair of pins formed on the turntable and slidably engaged respectively in a pair of slots formed in the body portion of the drive pin support, each slot extending parallel to the first notional line.

9. An apparatus for data transfer with a rotating data storage disk, including a turntable for supporting the data storage disk thereon, a spindle extending centrally through the turntable for centering engagement in a first opening defined centrally in the data storage disk, and a drive pin arranged eccentrically of the turntable for driving engagement in a second opening defined eccentrically in the data storage disk, the drive pin having an axis parallel to an axis of the spindle, wherein the improvement resides in a drive pin support mechanism comprising:

(a) a drive pin support fabricated from resilient sheet metal and being substantially arcuate in shape, the drive pin support supporting the drive pin on one end thereof;

(b) mounting means for coupling the drive pin support, in a position intermediate opposite ends thereof, to the turntable for joint rotation therewith and for pivotal motion relative to the turntable about an axis in an eccentric position on the turntable, the mounting means permitting the drive pin support with the drive pin thereon to travel linearly relative to the turntable in a plane parallel to a principal plane of the turntable along a first notional line orthogonally intersecting a second notional line extending through the axes of the drive pin and the spindle; and (c) resilient means acting between another end of the drive pin support and the turntable for urging the drive pin support toward the second notional line along the first notional line.

10. The apparatus of claim 9 wherein the mounting means comprises a pivot pin formed on the turntable and slidably engaged in a slot formed in the drive pin support, the slot extending along the first notional line.

* * * * *